(12) United States Patent
Lee et al.

(10) Patent No.: US 9,959,191 B2
(45) Date of Patent: May 1, 2018

(54) DYNAMIC LIBRARY PROFILING METHOD AND DYNAMIC LIBRARY PROFILING SYSTEM

(71) Applicant: Samsung Electronics Co., Ltd., Suwon-si (KR)

(72) Inventors: Min-Ju Lee, Hwaseong-si (KR); Bernhard Egger, Seoul (KR); Jae-jin Lee, Seoul (KR); Young-Lak Kim, Seongnam-si (KR); Hong-Gyu Kim, Seoul (KR); Hong-June Kim, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 493 days.

(21) Appl. No.: 14/087,667

(22) Filed: Nov. 22, 2013

(65) Prior Publication Data
US 2014/0149968 A1 May 29, 2014

(30) Foreign Application Priority Data
Nov. 23, 2012 (KR) ........................ 10-2012-0133854

(51) Int. Cl.
*G06F 9/44* (2006.01)
*G06F 11/34* (2006.01)

(52) U.S. Cl.
CPC ........ *G06F 11/3466* (2013.01); *G06F 11/348* (2013.01); *G06F 11/3409* (2013.01); *G06F 2201/86* (2013.01); *G06F 2201/88* (2013.01)

(58) Field of Classification Search
CPC .................... G06F 11/3466; G06F 2201/86
(Continued)

(56) References Cited

U.S. PATENT DOCUMENTS 5,086,386 A * 2/1992 Islam .................. G06F 11/3428
5,768,500 A   6/1998 Agrawal et al.
(Continued)

FOREIGN PATENT DOCUMENTS

EP  1 860 567 A1  11/2007
JP  8147199 A  6/1996
(Continued)

OTHER PUBLICATIONS

Luk, Chi-Keung, et al. "Pin: building customized program analysis tools with dynamic instrumentation." Acm sigplan notices. vol. 40. No. 6. ACM, 2005.pp. 190-200.*

(Continued)

*Primary Examiner* — Satish Rampuria
(74) *Attorney, Agent, or Firm* — Sughrue Mion, LLC

(57) ABSTRACT

A dynamic library profiling method and a dynamic library profiling system including writing a first break point instruction at a start address of a dynamic library function, recording a first event count value that is a process performance management unit (PMU) count when a target process executes the first break point instruction, writing a second break point instruction to a return address of the dynamic library function, and calculating a PMU count generated in a processor core while the dynamic library function is executed, by comparing the recorded first event count value with a second event count value that is a process PMU count when the target process executes the second break point instruction, wherein the process PMU count is a cumulative value of PMU counts generated in the processor core while the target process is executed.

11 Claims, 13 Drawing Sheets

(58) Field of Classification Search
USPC .................................................. 717/120–135
See application file for complete search history.

(56) References Cited

U.S. PATENT DOCUMENTS

| | | | |
|---|---|---|---|
| 5,970,245 A | 10/1999 | Poteat et al. | |
| 6,016,466 A * | 1/2000 | Guinther | G06F 11/3419 702/186 |
| 6,079,032 A | 6/2000 | Peri | |
| 6,249,907 B1 * | 6/2001 | Carter | G06F 11/3624 714/E11.209 |
| 6,263,491 B1 * | 7/2001 | Hunt | G06F 9/465 714/E11.209 |
| 6,330,691 B1 * | 12/2001 | Buzbee | G06F 11/3644 714/35 |
| 6,338,159 B1 | 1/2002 | Alexander, III et al. | |
| 6,381,735 B1 * | 4/2002 | Hunt | G06F 8/443 714/E11.209 |
| 6,658,654 B1 * | 12/2003 | Berry | G06F 11/3409 714/E11.192 |
| 6,728,955 B1 * | 4/2004 | Berry | G06F 11/3409 714/E11.192 |
| 6,988,271 B2 * | 1/2006 | Hunt | G06F 8/443 712/E9.084 |
| 7,032,213 B1 * | 4/2006 | Lupu | G06F 11/3644 714/E11.207 |
| 7,093,234 B2 | 8/2006 | Hibbeler et al. | |
| 7,340,378 B1 * | 3/2008 | Floyd | G06F 11/3466 702/186 |
| 7,506,316 B2 | 3/2009 | Vertes | |
| 7,661,032 B2 | 2/2010 | Ederbach et al. | |
| 8,583,939 B2 * | 11/2013 | Lee | G06F 21/54 713/190 |
| 8,856,753 B2 * | 10/2014 | Varadarajulu | G06F 11/3419 717/127 |
| 9,158,650 B2 * | 10/2015 | Akirekadu | G06F 11/3495 |
| 2002/0199172 A1 * | 12/2002 | Bunnell | G06F 11/3466 717/128 |
| 2004/0060043 A1 * | 3/2004 | Frysinger | G06F 11/3409 717/158 |
| 2004/0088699 A1 * | 5/2004 | Suresh | G06F 11/3419 717/174 |
| 2004/0111720 A1 | 6/2004 | Vertes | |
| 2004/0205723 A1 * | 10/2004 | Juan | G06F 11/3466 717/124 |
| 2004/0267548 A1 * | 12/2004 | Jones | G06F 11/3409 705/34 |
| 2005/0010908 A1 * | 1/2005 | Funk | G06F 11/3648 717/124 |
| 2005/0278145 A1 * | 12/2005 | Yamamoto | G06F 11/3466 702/182 |
| 2007/0050781 A1 * | 3/2007 | Furuichi | G06F 9/541 719/313 |
| 2007/0061626 A1 * | 3/2007 | Nelson | G06F 11/3688 714/38.14 |
| 2007/0169068 A1 | 7/2007 | Kanazawa et al. | |
| 2007/0226683 A1 * | 9/2007 | Stoodley | G06F 8/443 717/106 |
| 2007/0283331 A1 | 12/2007 | Pietrek | |
| 2008/0082844 A1 * | 4/2008 | Ghiasi | G06F 1/3203 713/323 |
| 2008/0092151 A1 * | 4/2008 | Brown | G06F 9/45516 719/331 |
| 2008/0127154 A1 * | 5/2008 | Drepper | G06F 9/45525 717/162 |
| 2010/0037101 A1 * | 2/2010 | Zakonov | G06F 11/3409 714/38.1 |
| 2010/0115494 A1 * | 5/2010 | Gorton, Jr. | G06F 11/3466 717/128 |
| 2010/0138811 A1 * | 6/2010 | Jayaraman | G06F 11/3466 717/125 |
| 2011/0145838 A1 * | 6/2011 | de Melo | G06F 11/3466 719/318 |
| 2011/0173588 A1 * | 7/2011 | Salapura | G06F 11/348 717/124 |
| 2011/0258617 A1 * | 10/2011 | Park | G06F 11/3636 717/157 |
| 2012/0011371 A1 | 1/2012 | Lee et al. | |
| 2012/0036501 A1 * | 2/2012 | Evensen | G06F 11/3636 717/128 |

FOREIGN PATENT DOCUMENTS

| | | |
|---|---|---|
| JP | 2000505919 A | 5/2000 |
| JP | 200299439 A | 4/2002 |
| JP | 2006313521 A | 11/2006 |
| JP | 200752625 A | 3/2007 |
| KR | 20030088523 A | 11/2003 |
| KR | 1020070050625 A | 5/2007 |
| KR | 1020100018827 A | 2/2010 |

OTHER PUBLICATIONS

Bala, Vasanth, Evelyn Duesterwald, and Sanjeev Banerjia. "Dynamo: a transparent dynamic optimization system." ACM SIGPLAN Notices 35.5 (2000): pp. 1-12.*

Vetter, Jeffrey. "Dynamic statistical profiling of communication activity in distributed applications." ACM SIGMETRICS Performance Evaluation Review. vol. 30. No. 1. ACM, 2002.pp. 1-11.*

Communication dated Mar. 30, 2015 issued by the European Patent Office in counterpart European Patent Application No. 13190805.5.

Communication issued by the European Patent Office dated Oct. 25, 2017 in counterpart European Patent Application No. 13190805.5.

* cited by examiner

DYNAMIC LIBRARY PROFILING METHOD AND DYNAMIC LIBRARY PROFILING SYSTEM

CROSS-REFERENCE TO RELATED APPLICATION

This application claims priority from Korean Patent Application No. 10-2012-0133854 filed on Nov. 23, 2012, in the Korean Intellectual Property Office, the contents of which are incorporated herein by reference in its entirety.

BACKGROUND

1. Field

Methods and apparatuses consistent with exemplary embodiments relate to a dynamic library profiling method and a dynamic library profiling system.

2. Description of the Related Art

Profiling refers to analysis of an execution status of a currently executed program or a communication status with an operating system (OS) kernel. Through profiling, performance information of the program can be measured, and factors potentially impacting performance may be detected.

SUMMARY

Exemplary embodiments provide a dynamic library profiling method, a computer readable recording medium storing the same and a dynamic library profiling system, which can measure performance measurement unit (PMU) event counts in dynamic library function units.

Exemplary embodiments also provide a dynamic library profiling method, a computer readable recording medium storing the same and a dynamic library profiling system, which can measure performance measurement unit (PMU) event counts in dynamic library function units in consideration of context switching occurring in a time sharing system.

According to an aspect of an exemplary embodiment, there is provided a dynamic library profiling method including writing a first break point instruction to a start address of a dynamic library function, recording a first event count value that is a process performance measurement unit (PMU) count when a target process executes the first break point instruction, writing a second break point instruction to a return address of the dynamic library function, and calculating a PMU count generated in a processor core while the dynamic library function is executed, by comparing the recorded first event count value with a second event count value that is a process PMU count when the target process executes the second break point instruction, wherein the process PMU count is a cumulative value of PMU counts generated in the processor core while the target process is executed.

According to an aspect of an exemplary embodiment, there is provided a dynamic library profiling method including allocating a task struct to a target process, and recording in the task struct as process performance measurement unit (PMU) counts PMU count values generated while the target process is executed, wherein the recording comprises initializing the PMU count values of a PMU counter of a processor core when the target process starts to be executed with context switching, and before the target process switches to another process, cumulatively recording as the process PMU counts current PMU count values of the PMU counter of the processor core in the task struct.

According to an aspect of an exemplary embodiment, there is provided a dynamic library profiling method including writing a first break point instruction to a start address of a dynamic library function, generating a function entry event when a target process executes the first break point instruction, writing a second break point instruction at a return address of the dynamic library function, and generating a function end event when the target process executes the second break point instruction.

According to still another aspect of an exemplary embodiment, there is provided a dynamic library profiling system including a PMU counter configured to record PMU count values that are cumulative values of events occurring in a processor core, a task struct in which process PMU counts that are the cumulative PMU counts recorded while the target process is executed are recorded for each target process, and a monitoring process configured to write a first break point instruction at a start address of a dynamic library function and to write a second break point instruction at a return address of the dynamic library function, wherein the monitoring process records a first event count value that is the process PMU count when the target process executes the first break point instruction, records a second event count value that is the process PMU count when the target process executes the second break point instruction, and calculates PMU counts generated in the processor core while the dynamic library function is executed, by comparing the first event count value with the second event count value.

BRIEF DESCRIPTION OF THE DRAWINGS

The above and other aspects will become more apparent by describing in detail exemplary embodiments with reference to the attached drawings in which.

DETAILED DESCRIPTION OF THE EXEMPLARY EMBODIMENTS

The exemplary embodiments will now be described more fully hereinafter with reference to the accompanying drawings. The exemplary embodiments may, however, be embodied in different forms and should not be construed as limited to the exemplary embodiments set forth herein. Rather, these exemplary embodiments are provided so that this disclosure will be thorough and complete, and will fully convey the scope of the disclosure to those skilled in the art. The same reference numbers indicate the same components throughout the specification.

The use of the terms "a" and "an" and "the" and similar referents are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art. It is noted that the use of any and all examples, or exemplary terms provided herein is intended merely to better illuminate the disclosure and is not a limitation on the scope of the disclosure unless otherwise specified. Further, unless defined otherwise, all terms defined in generally used dictionaries may not be overly interpreted.

Hereinafter, an exemplary embodiment will be described with reference to the accompanying drawings.

In the following description, a performance measurement unit (PMU) an internal component of a processor core, indicating a component for measuring events occurring in the processor core. Here, the events occurring in the processor core may be understood by one skilled in the art to mean clock cycles, memory operations, e.g., reads or writes, cache event, e.g., hits, misses or writebacks, execution instructions, and so on.

A PMU counter is a register provided within the PMU. The PMU counter counts events occurring in the processor core and records the cumulative values of PMU event counts. The PMU may be programmed in software, and the PMU counter may perform read and write operations using particular assembly instructions.

In the following description, the PMU count read from the PMU counter are used as a hardware PMU count.

A process scheduler is an internal component of an operating system (OS) kernel supporting a time sharing system. The process scheduler executes multiple processes by dividing central processing unit (CPU) availability according to the order of priority. In an exemplary embodiment, the OS kernel will be described with regard to a Linux kernel by way of example.

Figure 1:
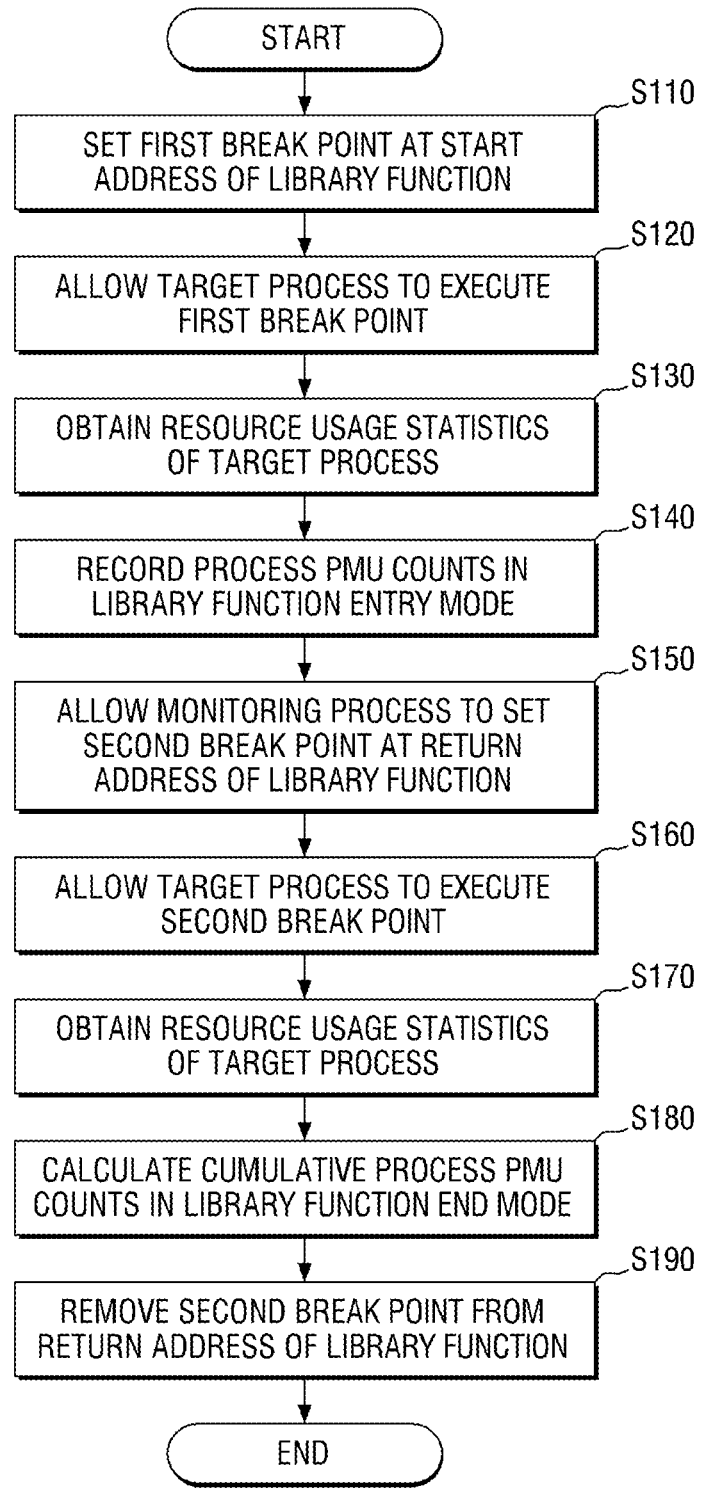
FIG. 1 is a schematic flow chart illustrating a dynamic library profiling method according to an exemplary embodiment.

FIG. 1 is a schematic flow chart illustrating a dynamic library profiling method according to an embodiment of the present invention and FIGS. 2 to 8 schematically illustrate operations of a monitoring process and a target process.

Referring to FIG. 1, first, a monitoring process sets a first break point at a start address of a library function (S110).

The monitoring process traces a user process and monitors events occurring in a processor core while the user process is executed. The monitoring process may include, for example, a profiler. Here, the profiler is a development tool for measuring performance of a program and discovering a bottleneck in the course of developing the program.

The library function may be, for example, a dynamic library function, but is not limited thereto.

Figure 2:
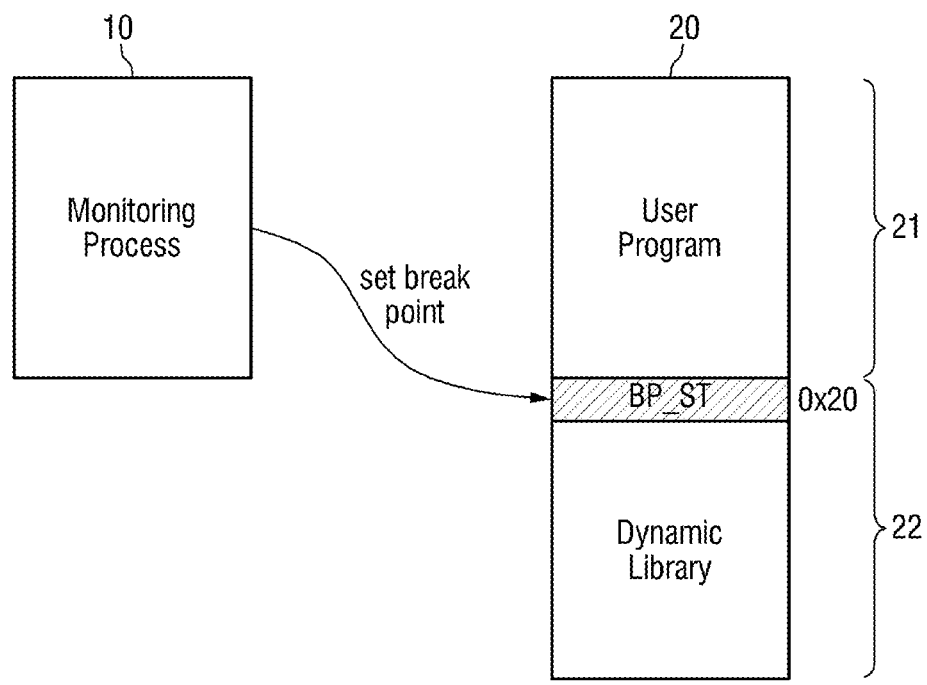
FIGS. 2 to 8 schematically illustrate operations of a monitoring process and a target process.

Referring to FIG. 2, a monitoring process 10 and a target process 20 are executed. The target process 20 is a user process that is a monitoring target of the monitoring process 10 and includes a user program 21 and a dynamic library 22 linked to the user program.

As described above, the monitoring process 10 traces a user process and may access (read, write) an address space of the target process 20. In an OS, such as Linux, the OS generally cannot directly access address spaces and registers of other user processes. However, the monitoring process 10 is exceptionally allowed to access the address spaces and registers of other user processes.

The monitoring process 10 sets the first break point BP_ST at the start address of the library function, e.g., at an address 0x20. Thereafter, the monitoring process 10 may enter a wait mode. The first break point BP_ST may be set by inserting, for example, a software break point instruction, but is not limited thereto.

In setting the first break point BP_ST, the original instruction of the start address of the library function may be replaced by the break point instruction.

Meanwhile, although not clearly shown, before the monitoring process 10 sets the first break point BP_ST at the start address of the library function, the dynamic library 22 may be loaded into a memory and linked with the user program 21.

In the user program 21, in order to call a predetermined dynamic library function, code for calling the dynamic library function of the user program 21 may call a procedure linkage table (PLT) corresponding to the dynamic library function, and a global offset table (GOT) having an address to which the dynamic library function is loaded may be referenced by the PLT. Here, the address to which the dynamic library function recorded in the GOT is loaded may be recorded by a dynamic linker. That is to say, a default value of the GOT may be set as the address of the dynamic linker. Accordingly, a first call of the dynamic library function executes the dynamic linker and loads the dynamic library to the memory, and the address of the dynamic library function may be recorded in the GOT. Thereafter, the code for calling the dynamic library function of the user program 21 can call the dynamic library function using the PLT by referencing the address of the dynamic library function recorded in the GOT without executing the dynamic linker.

Here, the PLT is a code region that is called for the first time in order for the user program 21 to call a predetermined dynamic library function. The PLT includes codes for indirectly calling various dynamic library functions for each dynamic library function. The GOT is a data region referenced by the PLT to call a predetermined dynamic library function. Addresses of dynamic library functions are stored in a memory space of the GOT.

Next, referring again to FIG. 1, the target process executes the first break point (S120). If the target process executes the first break point at the start address of the library function, an event, e.g., a function entry event, may be generated. The execution of the target process is stopped and the monitoring process may be released from the wait mode by the function entry event. As the target process executes the break point, the event may occur and the monitoring process may process the event, which will be described in more detail with reference to FIG. 9.

Figure 3:
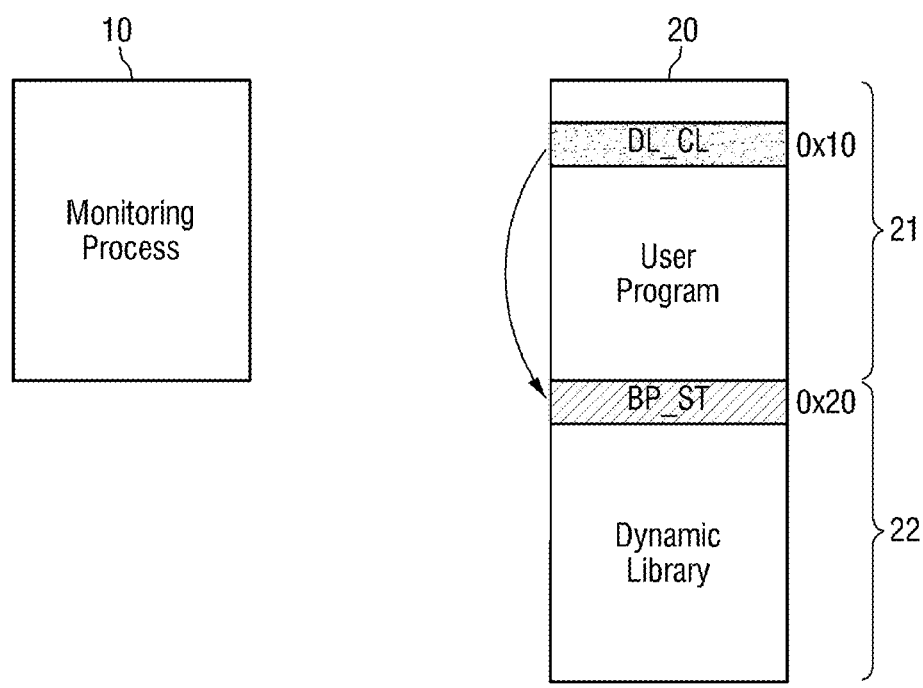

Referring to FIG. 3, a code (DL_CL) for calling a library function, e.g., a code of the address 0x10, is executed in the user program 21. Accordingly, the start address 0x20 of the library function may be called by referencing the address of the library function recorded in the GOT through the PLT corresponding to the library function.

Alternatively, the start address 0x20 of the library function may be directly called by directly calling the dynamic linker using, for example, a function pointer in a case of a library function loaded at run time. Eventually, the library function is called from the target process 20, and the first break point BP_ST set at the start address 0x20 of the library function is executed.

Next, referring again to FIG. 1, the monitoring process obtains resource usage statistics of the target process (S130). The monitoring process may be released from the wait mode by the function entry event and may obtain the resource usage statistics of the target process.

In the OS kernel, the resource usage statistics may include data concerning the resource usage statistics of processes, e.g., struct usages among wait factors of Linux, but are not limited thereto.

In an exemplary embodiment, process PMU count information may be added to the resource usage statistics. The process PMU count information is managed by the task struct of the target process and is a cumulative value of PMU counts for each target process generated while the target process is executed.

Here, the process PMU count is a cumulative value of PMU counts generated while the target process is executed, that is to say, from a time of starting to execute a predetermined user process scheduled to the processor core by the process scheduler to a time of stopping executing the user process when another user process is scheduled to the processor core. In general, hardware PMU counts are recorded corresponding to the respective processor cores. In an exemplary embodiment, however, the process PMU count is a PMU count recorded corresponding to each process.

Figure 4:
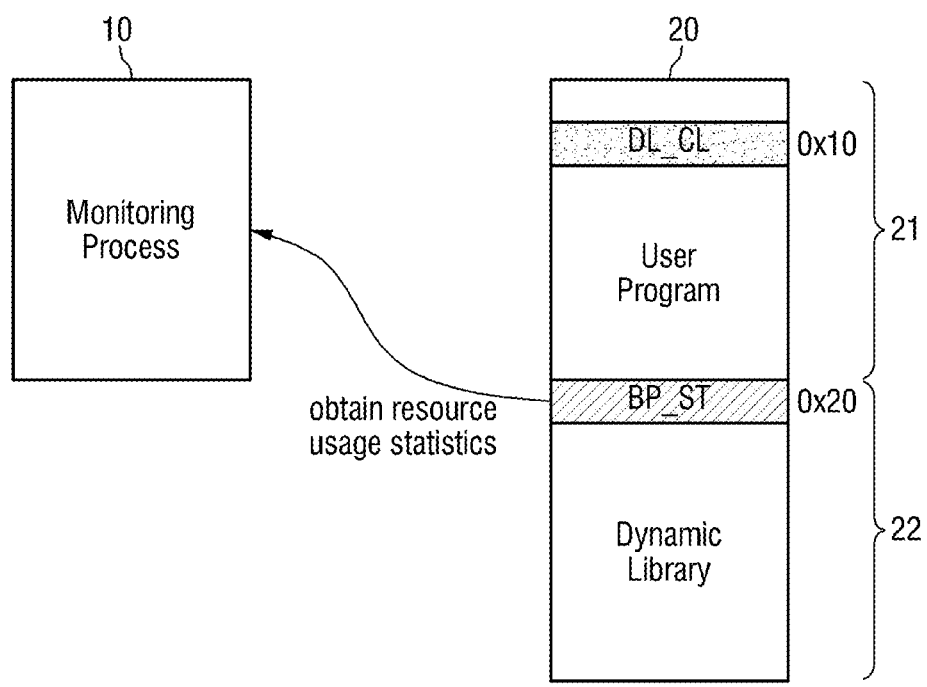

Referring to FIG. 4, the monitoring process 10 obtains first resource usage statistics of the target process 20. Here, the first resource usage statistics indicate the resource usage statistics of the target process 20 when the function entry event is generated as the first break point BP_ST of the target process 20 is executed. The first resource usage statistics include process PMU counts that are cumulative PMU counts generated in the processor core until the target process 20 executes the first break point BP_ST.

In general, the monitoring process 10 cannot directly access the OS kernel. In an exemplary embodiment, in order to transfer the process PMU count information collected in the OS kernel to the monitoring process 10, as described above, the resource usage statistics additively including the process PMU count information may be used, but are not limited thereto.

Next, referring again to FIG. 1, the monitoring process records process PMU counts in a library function entry mode (S140). The monitoring process extracts the process PMU counts from the first resource usage statistics of the target process and may record the extracted process PMU counts as first PMU counts.

Next, the monitoring process sets the second break point at the return address of the library function (S150). Thereafter, the monitoring process enters a wait mode, and execution of the target process may be resumed. The second break point may be set by inserting an instruction of the second break point, e.g., a software break point instruction, into the return address of the library function, but is not limited thereto.

Figure 5:
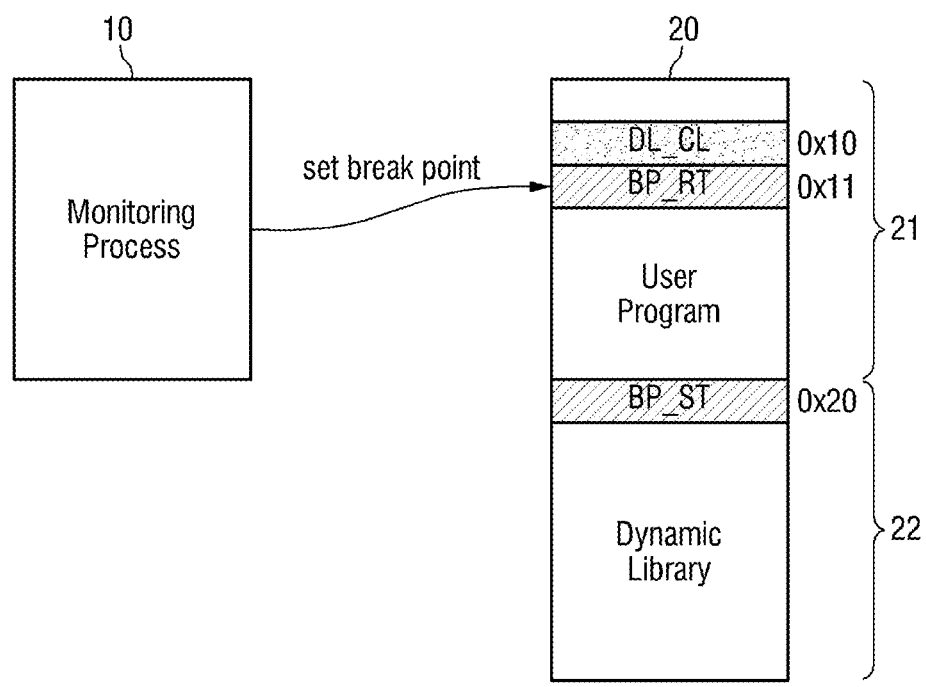

Referring to FIG. 5, the second break point BP_RT is set at the return address of the library function, e.g., an address 0x11. The return address of the library function may be an address in which the next execution code of the user program 21 of the target process 20 is recorded after the execution of the library function is completed.

Next, referring again to FIG. 1, the target process executes the second break point (S160). If the target process executes the second break point set at the return address of the library function, an event, e.g., a function end event, may occur. The execution of the target process is interrupted and the monitoring process may be released from the wait mode by the function end event.

Figure 6:
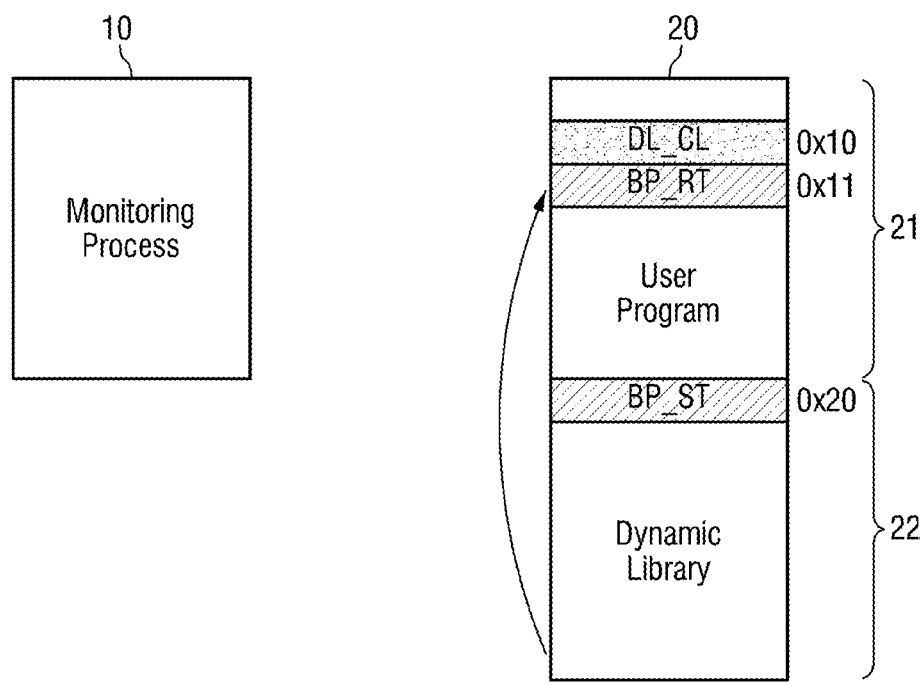

Referring to FIG. 6, in the user program 21, an execution code of the return address of the library function, e.g., a code of the address 0x11, is executed. As the execution of the library function is completed and the library function is returned from the target process 20, the second break point BP_RT set at the return address of the library function is executed.

Next, referring again to FIG. 1, the monitoring process obtains resource usage statistics of the target process (S170). The monitoring process is released from the wait mode by the function end event, while obtaining the resource usage statistics of the target process.

Figure 7:
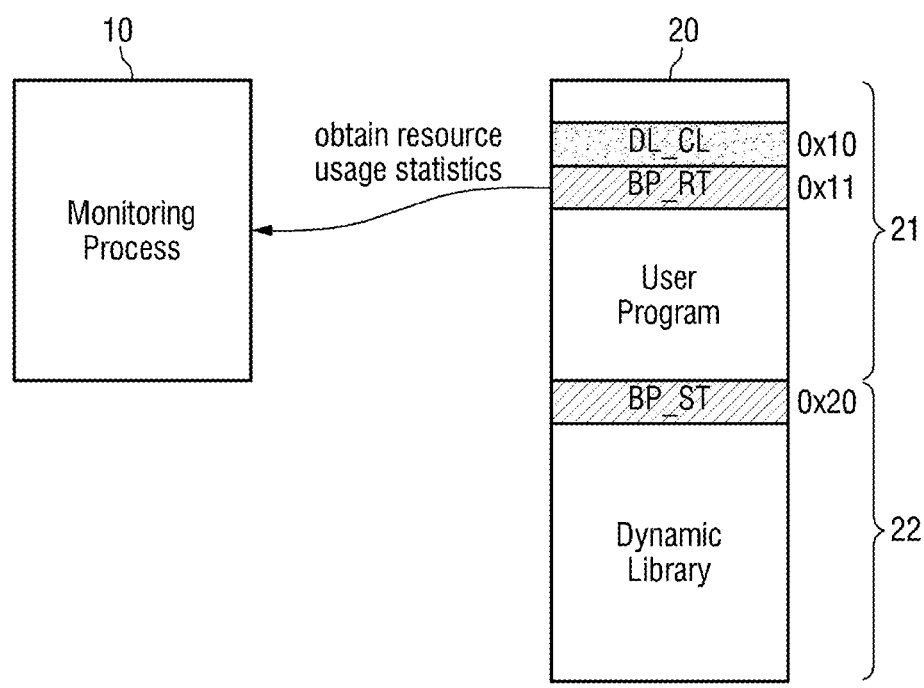

Referring to FIG. 7, the monitoring process 10 obtains second resource usage statistics of the target process 20. Here, the second resource usage statistics of the target process 20 are obtained at the time the function end even occurred according to the execution of the second break point BP_RT. The second resource usage statistics include cumulative process PMU counts of PMU counts generated in the processor core until the target process 20 has executed the second break point BP_RT.

Next, referring again to FIG. 1, the monitoring process calculates the cumulative process PMU counts in a library function end mode (S180). The monitoring process may extract a process PMU count from the second resource usage statistics of the target process and may record the extracted process PMU count as the second PMU count.

The monitoring process calculates the cumulative PMU count generated while the dynamic library function is executed by comparing the first PMU count with the second PMU count.

Meanwhile, the monitoring process may cumulatively store the calculated process PMU count for each dynamic library function. To this end, a storage space may be provided for cumulatively storing the PMU count for each dynamic library function. The storage space may be provided in, for example, a user memory space of the monitoring process, but is not limited thereto.

Next, the second break point is removed from the return address of the library function (S190). Thereafter, the monitoring process enters a wait mode, and execution of the target process may be resumed.

Figure 8:
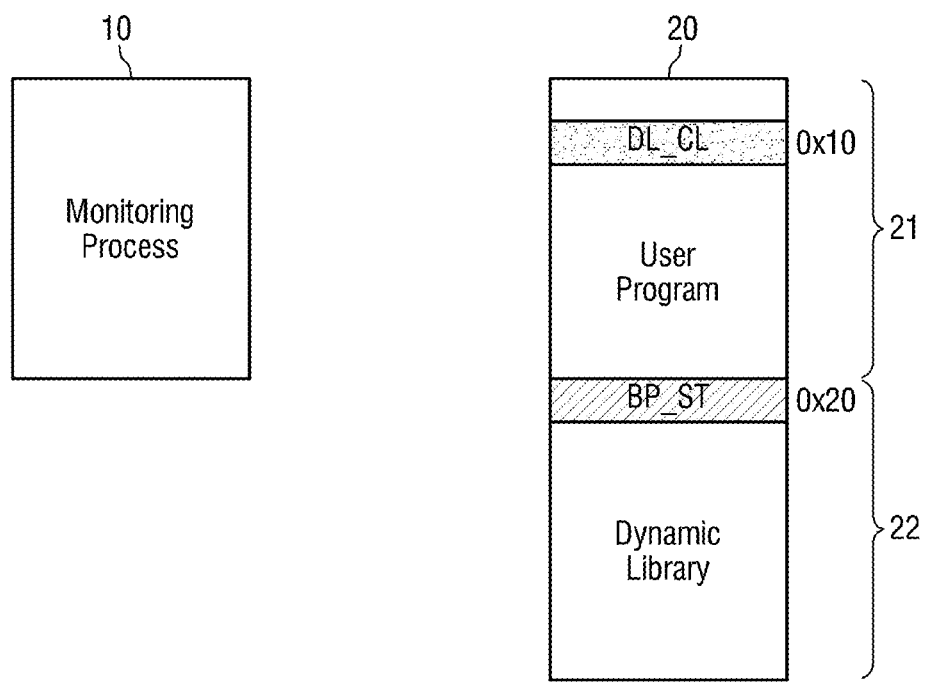

Referring to FIG. 8, the monitoring process 10 removes the second break point BP_RT from the return address 0x11 of the library function.

Conventional library function profiling approaches may include, for example, use of a monitoring code inserted at a compile time or at a run time, or a sampling based profiling.

However, several problems may arise in the conventional library function profiling approaches. That is to say, in the approach of using a monitoring code inserted at a compile time, recompiling may be required for performing profiling. In addition, when a context switch is performed in a time sharing system, a run time of another process may be associated with profiling, resulting in inaccurate results. In particular, the sampling based profiling has a limitation in that sampling based profiling may cause inaccurate, approximate results based on statistical data.

For example, ltrace, which is used in the Linux environment and is based on the approach of inserting a monitoring code at an execution time, may be used as a tool for tracing execution of a library function in performing profiling. In the ltrace, a software break point is inserted into a start point and an end point of the library function, and an execution time of a library function is calculated as a time at which a given event occurs with the break point. In addition, in the ltrace, the execution time of the library function target is calculated on the assumption that the library function starts at a start address of PLT corresponding to the library function.

In particular, with the ltrace, profiling cannot be performed on the library function dynamically loaded at the run time of the target process. Since addresses of library functions explicitly loaded at the run time are obtained using a function pointer through a dynamic linker and are directly called without passing through the PLT, any event cannot be obtained with the break point set at the PLT. In addition, profiling is enabled only when the library function is called for the first time, and profiling cannot be achieved when another library function is called from the library function. Moreover, when a context switch occurs in the time sharing system, a run time of another process may be unintentionally involved in calculating the run time of the target process.

However, in the dynamic library profiling method according to the exemplary embodiment, after the dynamic library function is loaded at the run time without inserting the break point into the start address of the PLT, the break point is set at the start address of the dynamic library function, thereby more extensively supporting the profiling of the dynamic library function.

Accordingly, even a library function that does not call a PLT can also be profiled. In addition, as will later be described, even when another library function is called from a pertinent library function, profiling of the respective library functions is enabled, thereby independently measuring and calculating process PMU counts of a caller and process PMU counts of a callee.

Figure 9:
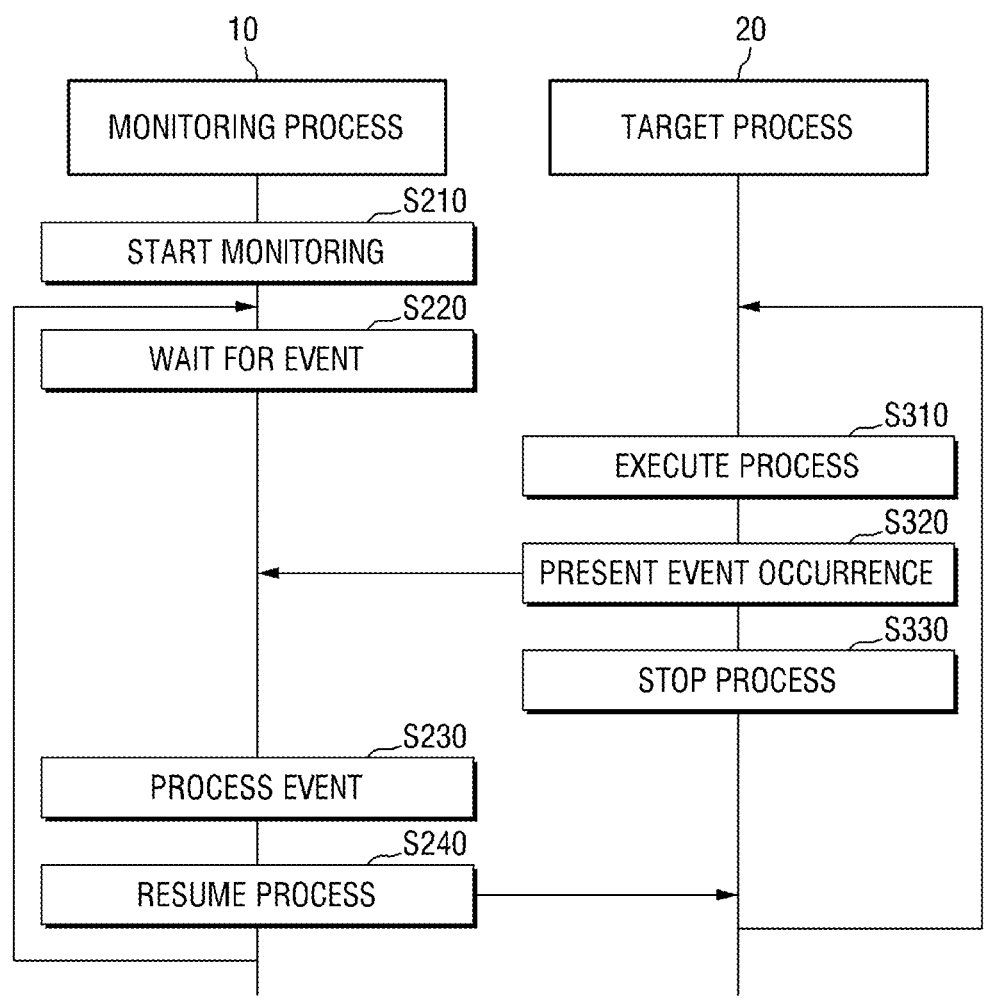
FIG. 9 schematically illustrates event occurrence in a target process and an event processing procedure in a monitoring process.

Hereinafter, event occurrence in a target process and an event processing procedure in a monitoring process will be described with reference to FIG. 9. FIG. 9 schematically illustrates event occurrence in a target process and an event processing procedure in a monitoring process.

Referring to FIG. 9, first, the monitoring process 10 starts to monitor the target process 20 (S210). As described above, the monitoring process 10 may set a first break point at a start address of a library function of the target process 20 while tracing the target process 20.

Next, the monitoring process 10 enters an event wait mode to wait for occurrence of an event (S220).

Next, the target process 20 is executed (S310). The target process 20 may execute the break point set by the monitoring process 10. For example, the target process 20 may execute a first break point set at the start address of the library function. Alternatively, the target process 20 may execute a second break point set at the return address of the library function.

Next, occurrence of an event in the target process 20 is detected (S320). When the target process 20 executes a break point, the event occurs in the target process 20. For example, when the target process 20 executes a first break point set at the start address of the library function, a function entry event may occur. Alternatively, the target process 20 may execute a second break point set at the return address of the library function, a function end event may occur.

The execution of the target process 20 is stopped (S330). If an event occurs, the execution of the target process 20 is stopped, and the occurrence of the event is notified to the monitoring process 10 to allow the monitoring process 10 to be released from the event wait mode.

Next, the monitoring process 10 may process the event (S230). As the target process 20 executes the break point, the monitoring process 10 may process the event. For example, in a case of a function entry event occurring when the target process 20 executes the first break point set at the start address of the library function, the monitoring process 10 may obtain the resource usage statistics of the target process 20 to then extract a process PMU count therefrom, thereby setting a second break point at the return address of the library function. Alternatively, in a case of a function end event occurring when the target process 20 executes the second break point set at the return address of the library function, the monitoring process 10 may obtain the resource usage statistics of the target process 20 to then extract a process PMU count therefrom, followed by removing the second break point set at the return address of the library function.

Next, the monitoring process 10 resumes execution of the target process 20 (S240). The monitoring process 10 processes the event in the above-described manner and again enters the wait mode to repeat the process steps from S220. Then, the monitoring process 10 resumes execution of the target process 20 to allow the target process 20 to repeatedly perform the process steps from S310.

Figure 10:
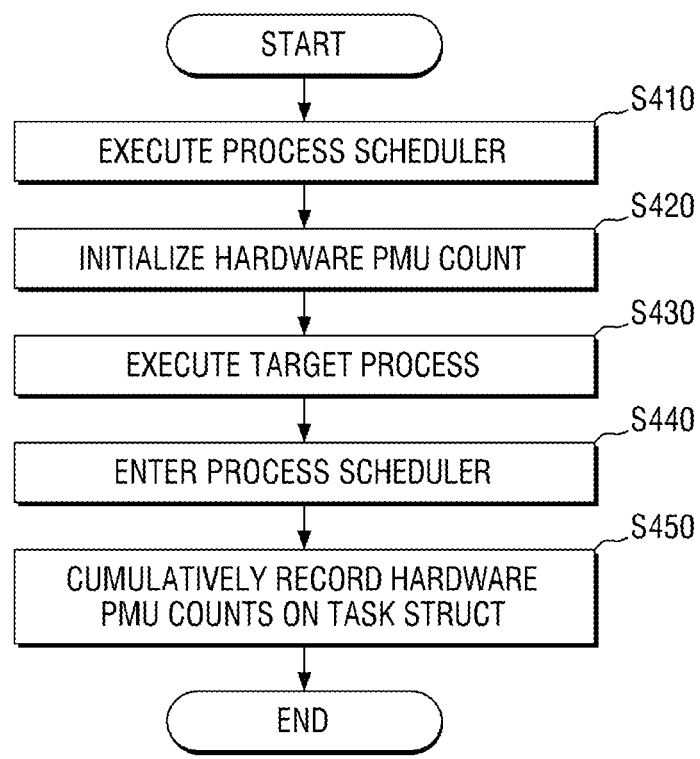
FIG. 10 is a schematic flow chart illustrating a process PMU count calculating procedure of a process scheduler.

Hereinafter, a process PMU count calculating procedure of a process scheduler will be described with reference to FIG. 10. FIG. 10 is a schematic flow chart illustrating a process PMU count calculating procedure of a process scheduler.

Referring to FIG. 10, the process scheduler is executed in an OS kernel (S410). As described above, the process scheduler executes multiple processes by dividing CPU availability according to the order of priority.

Next, when the target process starts to be executed through context switching, the process scheduler initializes a hardware PMU count of a PMU counter (S420). More specifically, the hardware PMU count may be initialized to 0 prior to a context switch, for example, when the monitoring process enters a wait mode and before the target process is executed.

Next, the OS kernel executes the target process (S430).

Next, in order to achieve context switching to another process, the target process enters a process scheduler (S440).

Next, the process scheduler cumulatively records hardware PMU counts in a task struct corresponding to the target process (S450). More specifically, the process scheduler reads hardware PMU counts cumulatively recorded in the PMU counter until the execution of the target process is completed and another user process is scheduled, for example, until the execution of the target process is stopped and the monitoring process is executed. Then, the read hardware PMU counts are cumulatively recorded in the process PMU counts recorded in the task struct corresponding to the target process.

The process PMU count calculating procedure shown in FIG. 10 may be repeatedly performed whenever a context switch occurs. Accordingly, even if the context switch occurs, the hardware PMU count generated when another user process is executed is not included in the process PMU count.

The process PMU count calculating procedure shown in FIG. 10 may be repeatedly performed whenever a context switch occurs. Accordingly, even if the context switch occurs, the hardware PMU count generated when another user process is executed is not included in the process PMU count.

Figure 11:
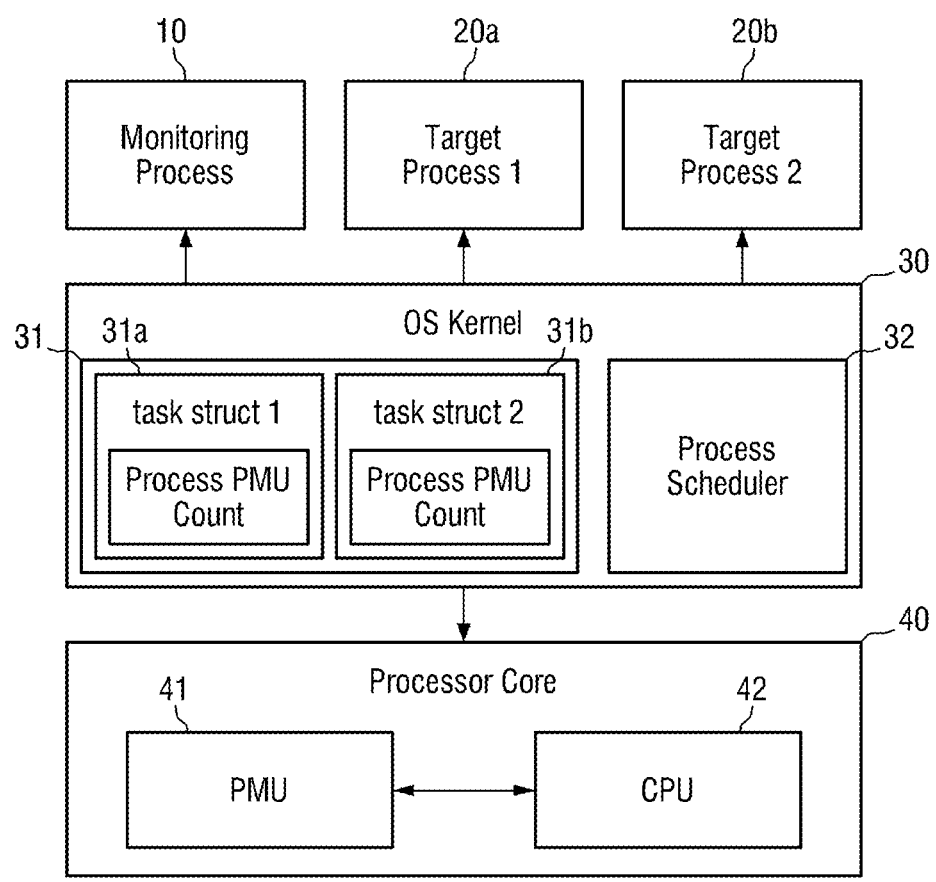
FIGS. 11 and 12 illustrate a profiling system using task structs corresponding to processes to measure process PMU counts.
Figure 12:
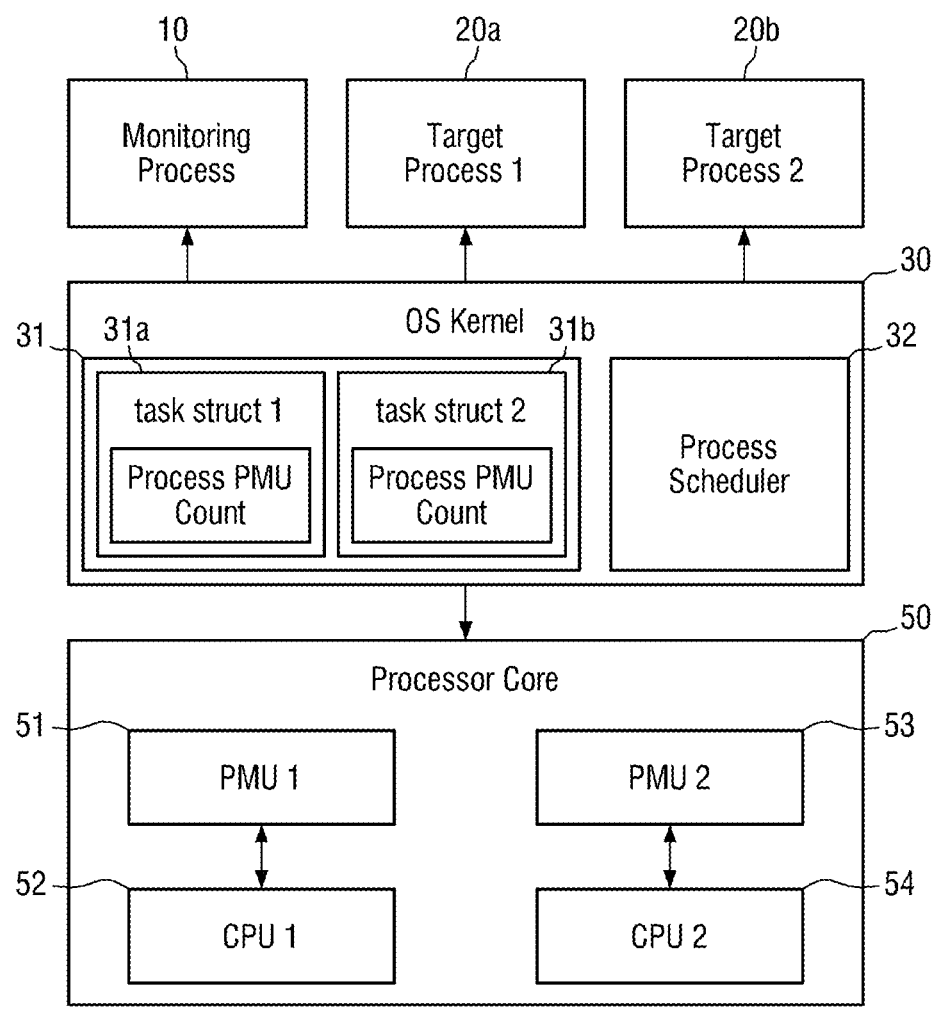

FIGS. 11 and 12 illustrate a profiling system using task structs corresponding to processes to measure process PMU counts.

Referring to FIG. 11, the profiling system includes a monitoring process 10, a first target process 20a, a second target process 20b, an OS Kernel 30, and a processor core 40.

When a function entry event and a function end event are generated, the monitoring process 10 may extract process PMU counts of the target processes from resource usage statistics, and based on the extracted process PMU counts, may calculate the process PMU counts generated during execution of a target library function.

The first target process 20a and the second target process 20b are user processes to be traced by the monitoring process 10. Two target processes, that is, the first target process 20a and the second target process 20b, are exemplified in FIG. 11, but aspects of the exemplary embodiment are not limited thereto.

The OS kernel 30 includes a task struct 31 and a process scheduler 32. The task struct 31 is a data structure allocated to each process from the OS kernel 30. The task struct 31, including a first task struct 31a and a second task struct 31b, is exemplified in FIG. 11, but aspects of the exemplary embodiment are not limited thereto.

A space for cumulatively recording process PMU counts may be additionally provided in each of the task structs 31a and 31b. The process PMU counts generated while the first target process 20a is scheduled may be recorded in the first task struct 31a, and the process PMU counts generated while the second target process 20b is scheduled may be recorded in the second task struct 31b. The processor core 40 may include a PMU 41 and a CPU 42. The PMU 41 measures events occurring in the processor core 40 and records PMU count values in PMU counters. Various events occurring during execution of a library function may be measured according to the number of PMU counters supported by the PMU 41. The CPU 42 executes a user process according to the process scheduler 32 in process scheduling.

Referring to FIG. 12, the profiling system includes a processor core 50, which may be a multi processor core. The processor core 50, including a first CPU 52 and a second CPU 54, is exemplified in FIG. 12, but is not limited thereto.

The multi processor core 50 may include PMUs 51 and 53 corresponding to the CPUs 52 and 54.

According to the process PMU count calculating procedure shown in FIG. 10 and the profiling system using the task structs corresponding to the processes shown in FIGS. 11 and 12, the process PMU count generated during execution of each process can be retained in the internal data structure of the OS kernel. Accordingly, even when a context switch is performed in a time sharing system, a task struct independently allocated for each process by the OS kernel is used, thereby preventing hardware PMU counts of another user process from being unintentionally included in the process PMU counts of the target process.

Figure 13:
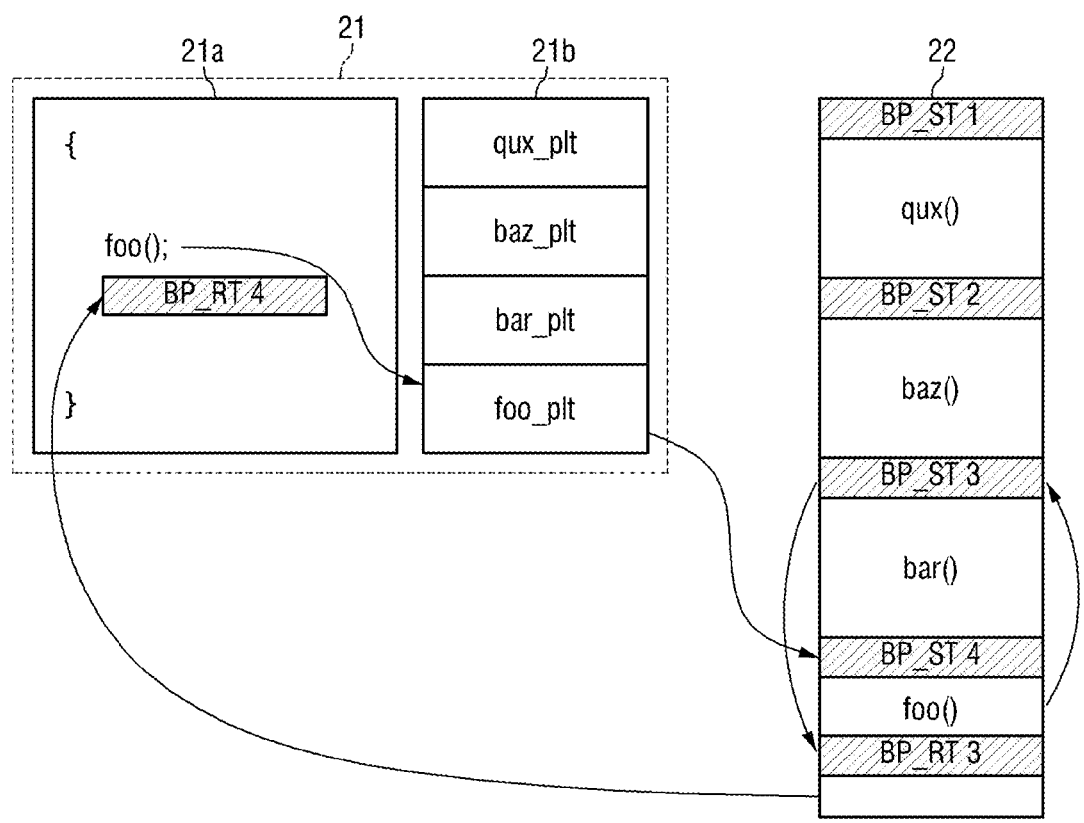
FIG. 13 illustrates a process PMU count measuring procedure when another library function is called from a library function of a target process.

Hereinafter, a process PMU count measuring procedure when another library function is called from a library function of a target process will be described with reference to FIG. 13. FIG. 13 illustrates a process PMU count measuring procedure when another library function is called from a library function of a target process.

Referring to FIG. 13, a user program 21 includes an execution code 21a and a PLT 21b. The PLT 21b is a code region for calling dynamic library functions, which will later be described, and may include, for example, qux_plt, baz_plt, bar_plt, foo_plt, and so on.

A dynamic library 22 linked to the user program 21 may include, for example, dynamic library functions, such as qux( ), baz( ), bar( ), or foo( ). Through a monitoring process, break points BP_ST1, BP_ST2, BP_ST3, and BP_ST 4 are set at start addresses of the dynamic library functions, respectively.

If a dynamic library function, e.g., foo( ), is called in the execution code 21a, a code region for calling foo( ), e.g., foo_plt, is called from the PLT 21b. Next, the code region foo_plt calls the function foo( ) of the dynamic library 22 loaded to a memory by referencing the address of foo( ) recorded in GOT (not shown).

Since a first break point BP_ST4 is set at a start address of foo( ), a function entry event is generated, and the monitoring process records the process PMU count in a foo( ) function entry mode as a first PMU count value. Thereafter, the monitoring process sets a second break point BP_RT4 at a return address of foo( ).

Next, if another dynamic library function, e.g., bar( ), is called while foo( ) is executed, a function entry event is generated because a third break point BP_ST3 is set at a start address of bar( ), and the monitoring process records the process PMU count in a bar( ) function entry mode as a second PMU count value. Thereafter, the monitoring process sets a fourth break point BP_RT3 at a return address of bar( ).

Next, if execution of bar( ) is completed and bar( ) is returned, a function end event is generated because the fourth break point BP_RT3 is set at the return address of bar( ), and the monitoring process records the process PMU count in a bar( ) function end mode as a third PMU count value.

Next, if execution of the remaining codes of foo( ) is completed and foo( ) is returned, a function entry event is generated because the second break point BP_RT4 is set at the return address of foo( ), and the monitoring process records the process PMU count in a foo( ) function end mode as a fourth PMU count value.

In order to calculate a substantial process PMU count generated when the foo( ) function is executed, the monitoring process obtains a difference between the PMU count obtained by subtracting the first PMU count value from the fourth PMU count value and the PMU count obtained by subtracting the second PMU count value from the third PMU count value. As described above, according to an exemplary embodiment, since PMU counts of a caller and a callee can be independently measured and calculated, profiling of the respective library functions can be achieved.

The steps of the method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an application specific integrated circuit (ASIC). Additionally, the ASIC may reside in a user terminal. Alternatively, the processor and the storage medium may reside as discrete components in a user terminal.

In concluding the detailed description, those skilled in the art will appreciate that many variations and modifications can be made to the preferred embodiments without substantially departing from the principles of the present invention. Therefore, the exemplary embodiments used in a descriptive sense and not for purposes of limitation.

What is claimed is:

1. A dynamic library profiling method of a monitoring process that monitors execution of a target process comprising a user program and a dynamic library function dynamically loaded into memory and linked with the user program, the method comprising:
   writing a first break point instruction to a start address of the dynamic library function indicated by calling a procedure linkage table (PLT) corresponding to the dynamic library function, the PLT referencing a global offset table (GOT) storing the start address of the dynamic library function, in an address space of the target process in the memory after the dynamic library function is loaded at run time of the target process;
   recording a first event count value that is a process performance measurement unit (PMU) count when the target process executes the first break point instruction;
   writing a second break point instruction to an address of the user program to which the dynamic library function returns in the address space of the target process in the memory; and calculating a PMU count value generated in a processor core while the dynamic library function is executed, by comparing the recorded first event count value with a second event count value that is a process PMU count when the target process executes the second break point instruction,
   wherein the process PMU count is a cumulative value of PMU count values generated in the processor core while the target process is executed and is not comprised a process PMU count of other processes different from the target process when a context switch occurs in time sharing system,
   wherein the recording of the first event count value comprises obtaining first resource usage statistics of the target process when the target process executes the first break point instruction,
   wherein the first resource usage statistics include process PMU counts that are cumulative PMU count values generated in the processor core during execution of the target process until the target process executes the first break point instruction.

2. The dynamic library profiling method of claim 1, wherein the recording of the first event count value comprises recording the first event count value by extracting the process PMU count of the target process from the first resource usage statistics of the target process.

3. The dynamic library profiling method of claim 1, wherein the calculating of the PMU count value generated in a processor core comprises obtaining second resource usage statistics of the target process when the target process executes the second break point instruction.

4. The dynamic library profiling method of claim 3, wherein the calculating of the PMU count value generated in a processor core further comprises extracting the process PMU count of the target process from the second resource usage statistics of the target process.

5. The dynamic library profiling method of claim 4, wherein the calculating of the PMU count value generated in a processor core comprises calculating the PMU count value generated in a processor core while the dynamic library function is executed, by comparing the extracted second event count value with the recorded first event count value.

6. The dynamic library profiling method of claim 3, wherein the second resource usage statistics include process PMU counts that are cumulative PMU count values generated in the processor core during execution of the target process after the target process executes the first break point instruction until the target process executes the second break point instruction.

7. The dynamic library profiling method of claim 1, further comprising removing the second break point instruction from the address of the user program.

8. The dynamic library profiling method of claim 1, further comprising:
   after the writing of the first break point instruction, entering a wait mode of the monitoring process,
   wherein the recording of the first event count value comprises releasing the monitoring process from the wait mode when the target process executes the first break point instruction.

9. The dynamic library profiling method of claim 1, further comprising:
   after writing of the second break point, entering a wait mode of the monitoring process,
   wherein the recording of the second event count value comprises releasing the monitoring process from the wait mode when the target process executes the second break point instruction.

10. A dynamic library profiling system comprising:
    a performance measurement unit (PMU) counter that records PMU count values that are cumulative values of events occurring in a processor core;
    a task struct allocated by an operating system (OS) kernel in which process PMU counts that are the cumulative PMU count values recorded while the target process is executed are recorded for each target process, wherein the task struct is an internal data structure of the OS kernel; and
    a monitoring process that writes a first break point instruction at a start address of a dynamic library function indicated by calling a procedure linkage table (PLT) corresponding to the dynamic library function, the PLT referencing a global offset table (GOT) storing the start address of the dynamic library function, and to write a second break point instruction at a return address of the dynamic library function, after the dynamic library function is loaded at run time of the target process,
    wherein the monitoring process records a first event count value that is the process PMU count when the target process executes the first break point instruction, records a second event count value that is the process PMU count when the target process executes the second break point instruction, and calculates PMU counts generated in the processor core while the dynamic library function is executed, by comparing the first event count value with the second event count value, and
    wherein the task struct is allocated to the target process for storing the PMU count values generated exclusively while the target process is executed and the process PMU count is not comprised a process PMU count of other processes different from the target process when a context switch occurs in time sharing system,
    wherein the OS kernel records a cumulative PMU count of the PMU counts recorded while the target process is executed on a task struct corresponding to the target process,
    wherein the process PMU counts recorded in the task struct are stored in resource usage statistics of the target process, and the monitoring process extracts the first event count value and the second event count value from the resource usage statistics.

11. The dynamic library profiling system of claim 10, wherein after calculating the PMU count generated in the processor core while the dynamic library function is executed, the monitoring process removes the second break point instruction from the return address of the dynamic library function.

* * * * *